(12) United States Patent
Falkenstein

(10) Patent No.: US 8,457,823 B2
(45) Date of Patent: Jun. 4, 2013

(54) METHOD AND DEVICE FOR OPERATING A HYBRID VEHICLE

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/998,836

(22) PCT Filed: Nov. 6, 2009

(86) PCT No.: PCT/EP2009/064795
§ 371 (c)(1),
(2), (4) Date: Aug. 10, 2011

(87) PCT Pub. No.: WO2010/072461
PCT Pub. Date: Jul. 1, 2010

(65) Prior Publication Data
US 2011/0288702 A1 Nov. 24, 2011

(30) Foreign Application Priority Data
Dec. 16, 2008 (DE) .......................... 10 2008 054 704

(51) Int. Cl.
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC ................. 701/22; 477/3; 477/174; 180/348; 701/102

(58) Field of Classification Search
USPC ...... 477/3, 5, 2, 63; 180/65.25, 65.26; 701/22
See application file for complete search history.

(56) References Cited

U.S. PATENT DOCUMENTS

| 5,951,614 | A | * | 9/1999 | Tabata et al. .................... 701/54 |
| 6,077,186 | A | * | 6/2000 | Kojima et al. .................... 477/3 |
| 6,336,889 | B1 | * | 1/2002 | Oba et al. .......................... 477/5 |
| 6,494,277 | B1 | * | 12/2002 | Boggs et al. ................ 180/65.25 |
| 6,607,048 | B2 | * | 8/2003 | Ohsawa .................... 180/65.26 |
| 7,121,975 | B2 | * | 10/2006 | Tomura et al. .................... 477/2 |
| 7,197,382 | B2 | * | 3/2007 | Prema et al. ..................... 701/22 |
| 7,220,212 | B2 | * | 5/2007 | Endo ................................ 477/3 |
| 7,670,257 | B2 | * | 3/2010 | Popp et al. ........................ 477/6 |
| 7,824,307 | B2 | * | 11/2010 | Matsubara et al. ............... 477/5 |
| 7,922,618 | B2 | * | 4/2011 | Matsubara et al. ............... 477/3 |
| 8,029,408 | B2 | * | 10/2011 | Seel ................................. 477/5 |
| 8,108,089 | B2 | * | 1/2012 | Hasegawa et al. ............. 701/22 |

(Continued)

FOREIGN PATENT DOCUMENTS

| DE | 10 2006 047 655 | 4/2008 |
| EP | 0 922 600 | 6/1999 |
| EP | 1 439 296 | 7/2004 |

Primary Examiner — Thomas Black
Assistant Examiner — Robert Payne
(74) Attorney, Agent, or Firm — Kenyon & Kenyon LLP

(57) ABSTRACT

In a method for operating a hybrid vehicle, an idle first drive unit is started during the driving of the hybrid vehicle by transferring part of a torque from an operating second drive unit to the first drive unit. To minimize effects on the movement characteristics of the hybrid vehicle during starting and/or stopping of the first drive unit, a control unit is provided for influencing the torque of the operating second drive unit by at least one of the variables derived from the longitudinal movement of the hybrid vehicle.

15 Claims, 5 Drawing Sheets

U.S. PATENT DOCUMENTS

| | | | |
|---|---|---|---|
| 8,123,657 B2 * | 2/2012 | Mittelberger et al. | 477/5 |
| 8,142,328 B2 * | 3/2012 | Reuschel | 477/6 |
| 8,192,324 B2 * | 6/2012 | Kraska et al. | 477/5 |
| 8,313,413 B2 * | 11/2012 | Nomasa et al. | 477/3 |
| 2007/0056784 A1 * | 3/2007 | Joe et al. | 180/65.2 |
| 2008/0274856 A1 | 11/2008 | Seel | |

* cited by examiner

METHOD AND DEVICE FOR OPERATING A HYBRID VEHICLE

BACKGROUND OF THE INVENTION

1. Field of the Invention

The present invention relates to a method for operating a hybrid vehicle, in which an idle first drive unit is started while the hybrid vehicle is being driven, by transferring a torque from an operating second drive unit to the first drive unit, and a device for implementing this method.

2. Description of Related Art

Vehicles having a hybrid drive structure usually have an internal combustion engine as the first drive unit and an electric motor or a hydraulic motor as the second drive unit. Other additional drive units are also possible. For example, the torque may be applied by the drive units during the starting operation of the hybrid vehicle. All-electric or hydraulic driving is also possible. It may be necessary to start the internal combustion engine during electric or hydraulic driving, for example, if the driver requires more power than the electric motor or the hydraulic motor is able to supply or if the energy content of an energy storage mechanism drops too significantly.

A separating clutch, which couples the internal combustion engine for the start in a slipping state, has inaccuracies. In addition, the required time characteristic of the starting torque or the starting power is not precisely determinable due to varying friction and compression conditions of the internal combustion engine. Both prevent accurate compensation of the starting torque or the starting power by the electric motor or the hydraulic motor. The uncompensated portion acts as a disturbance on the drive train that causes rotational vibrations and reduces driving comfort.

Published German patent application document DE 10 2006 047 655 A1 describes a method for operating a parallel hybrid drive, which has an electric machine and an internal combustion engine. When the vehicle is being driven, the internal combustion engine is started with the aid of the electric machine by engaging the separating clutch. During regulation in which an operating variable of the parallel hybrid drive is detected and compared with a corresponding model operating variable of a model of the parallel hybrid drive, a deviation of the electric machine resulting from the comparison is at least partially compensated.

BRIEF SUMMARY OF THE INVENTION

The method according to the present invention for operating a hybrid vehicle has the advantage that during the start and/or stop of the first drive unit, the torque or power of the second drive unit is acted upon based on a measured, observed or modeled characteristic of the longitudinal movement of the hybrid vehicle in order to counteract the disturbance occurring when starting and/or stopping the first drive unit. At the start of the first drive unit, the first drive unit is tow-started, thereby preventing a resulting temporary dip in the angular velocity of the second drive unit. Likewise, a temporary increase in the angular velocity of the second drive unit is compensated; this may occur in ramp-up of the first drive unit due to overshooting of the angular velocity of the first drive unit.

In one embodiment, the variable derived from the longitudinal movement of the vehicle is high-pass filtered and influences the torque of the second drive unit. Constant components are removed from the variable by high-pass filtering. It then contains only any drive train vibrations which might still occur. Connecting the derived variable to the second drive unit counteracts the drive train vibrations. It is not necessary to compare a setpoint value to an actual value.

Advantageously at least one of the variables derived from the longitudinal movement of the hybrid vehicle is a setpoint value, which is compared with an actual value supplied by the second drive unit and/or from the movement of the hybrid vehicle, the torque or the power of the second drive unit being regulated as a function of the comparison. In this way, a control loop over the entire drive train is closed. Units or transfer elements of the drive train having only imprecisely known properties, for example, a torque converter or a converter clutch, are inside the control loop. Their values, which influence the drive train, are detected by regulation feedback. Since inaccuracies are compensated by regulation, high driving comfort is made possible and rotational vibrations are regulated out optimally.

In one embodiment, the variable derived from the longitudinal movement of the hybrid vehicle is determined by measuring the wheel rotational speeds, the wheel rotational accelerations, the longitudinal speed of the vehicle and/or the longitudinal acceleration of the vehicle. Using these measurements and calculations, which are determined as such for other applications in the hybrid vehicle, it is possible to determine the desired parameter inexpensively. Additional use of sensors or an increase in the computing capacity of microcomputers in the vehicle is not necessary.

In one further refinement, the variable derived from the longitudinal movement of the hybrid vehicle is a velocity of the vehicle mass, a differential velocity of the vehicle mass and a mass of the second drive unit and/or an acceleration of the vehicle mass. This definition of the variable reliably takes into account the vibration of the second drive unit against the vehicle mass in influencing the torque of the second drive unit. The acceleration of the vehicle mass is advantageously filtered.

In another embodiment, the variable derived from the longitudinal movement of the vehicle is ascertained at a point in time when the engaging operation of the separating clutch is just beginning or has not yet begun. Since the separating clutch engages gradually, this has the advantage that the variable is determined before the start of the first drive unit and thus the dips or overshooting caused by tow-starting or initial firings do not yet have any influence on the drive train. The reference variable is therefore determined at a point in time when the hybrid vehicle is being driven only by the second drive unit.

In one further refinement, the setpoint value derived from the longitudinal movement of the hybrid vehicle is compared with the actual value derived from the vehicle movement for a predefined period. The torque of the second drive unit is then regulated only when the first drive unit is being started. It is regulated only until the first drive unit has stabilized and is making its normal contribution to the drive of the hybrid vehicle.

In one embodiment, the setpoint value derived from the longitudinal movement of the hybrid vehicle remains unchanged for the predefined period. Reliable regulation of operation of the drive train before the first drive unit is started is made possible in this way. However, it is also possible for the setpoint value to be adjusted to the changing boundary conditions. For example, this is possible if the driver changes his driving intent during the starting of the first drive unit.

The predefined period includes at least the time span from the start of the engagement operation until complete engagement of the separating clutch.

The setpoint value is advantageously ascertained on the basis of a model. During the starting operation of the first drive unit, a modeled longitudinal movement of the vehicle, which would result if no starting operation of the first drive unit were active, is calculated. The model takes into account a changing driver's intended moment, estimated driving resistance forces such as atmospheric resistance, rolling resistance and gradient resistance, moments of inertia, the dynamic response of the drive train and/or properties of the drive units, such as moment limits. On the basis of the modeled longitudinal movement of the vehicle, a modeled angular velocity and a modeled filtered angular acceleration of an equivalent vehicle rotational mass are calculated and used as setpoint values for a comparison with the actual values for the regulation.

Likewise, on the basis of the modeled longitudinal movement of the vehicle, a modeled angular velocity can be ascertained for a rotational mass of the second drive unit for the case when no starting operation of the first drive unit is active. The modeled angular velocity may be ascertained, for example, with the aid of a torque converter model and used as the setpoint value for a regulation.

The actual values may include jerking vibrations or drive train vibrations.

It is favorable if the modeled longitudinal movement of the vehicle and the setpoint values determined therefrom do not include any vibrating components. Regulation then includes a vibration damping effect.

In one embodiment, the starting operation of the first drive train is recognized by the time characteristic of a difference between the setpoint value and the actual value. Additional measurement means are thus unnecessary.

In another further refinement, in the case of a device for operating a hybrid vehicle, an idle first drive unit is started by transferring a torque from an operating second drive unit to the first drive unit. To minimize effects during starting and/or stopping of the first drive unit on the movement characteristics of the hybrid vehicle, means are present for influencing the torque or the power of the operating second drive unit through a variable derived from the longitudinal movement of the hybrid vehicle. This achieves a high level of driving comfort of the hybrid vehicle because effects of vibration on the vehicle mass in particular are suppressed.

A separating clutch is advantageously situated between the first and the second drive units, the first drive unit being started by transferring the torque from the second drive unit to the first drive unit by engaging the separating clutch. The separating clutch is a mechanically simple component via which the torque is transferred.

In one embodiment, a planetary gear is situated between the first and the second drive units, the first drive unit being started by transferring the torque from the second drive unit to the first drive unit via the planetary gear. Thus, a use in power-branched hybrid drives, which do not have a separating clutch and which start the internal combustion engine with the aid of rotational speed superpositioning of the planetary gear, is also possible. Since the time characteristic of the starting torque or the starting power is not accurately determinable because of varying friction conditions and compression conditions of the internal combustion engine, and accurate compensation of the starting torque or the starting power is impossible, the resulting disturbances are counteracted and driving comfort is improved through the embodiment according to the present invention.

In one further refinement, the first drive unit is situated on a first vehicle axle and the second drive unit is situated on a second vehicle axle. Alternatively, the first drive unit may act on one wheel of the motor vehicle, while the second drive unit acts on another wheel. For example, tow-start and acceleration of the first drive unit may be accomplished by the second drive unit via a friction-locking effect over the road. The control loop is then closed for the entire vehicle. Inaccuracies are compensated and driving comfort is improved.

The second drive unit may be designed as an electric motor or as a hydraulic motor.

DETAILED DESCRIPTION OF THE INVENTION

Figure 1:
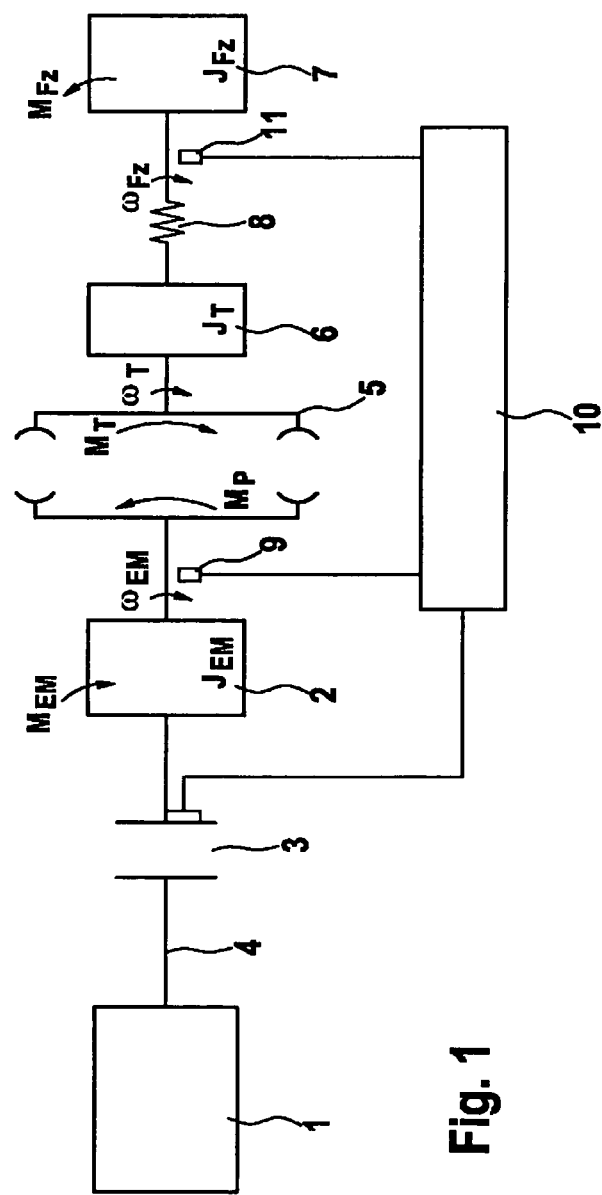
FIG. 1 shows a basic diagram of a parallel hybrid drive train.

The same features are indicated by the same reference numerals in the figures.

FIG. 1 shows a simplified model of a parallel hybrid drive train, in which an internal combustion engine 1 and an electric motor 2 are connected to one another via a separating clutch 3. Electric motor 2 is positioned on drive shaft 4 of internal combustion engine 1. Electric motor 2 drives the drive wheels (not shown here) of the vehicle via a torque converter 5 and an automatic transmission (also not shown here).

The rotatory moments of inertia of the turbine rotating at angular velocity $\omega_T$ of torque converter 5 and of parts of the automatic transmission are translated to the transmission input shaft and combined with moment of inertia $J_T$, which is associated with torque converter 5, in a rotatory turbine rotational mass 6.

The rotatory inertias of drive shafts and wheels as well as the translationally moving vehicle mass (representing the inertia of the vehicle) are translated to the transmission input shaft according to the gear ratios and are combined with the moment of inertia $J_{Fz}$ in an equivalent vehicle rotational mass 7.

The drive shafts (in particular the side shafts having a dominant stiffness) mounted between turbine rotational mass 6 and equivalent vehicle rotational mass 7 are simulated by a torsion spring 8 having spring stiffness c and damping d.

The driving resistance forces (air resistance, rolling resistance and gradient resistance) are translated into a driving resistance moment $M_{Fz}$ acting on equivalent vehicle rotational mass 7. In addition, the moment transferred via torsion spring 8 acts on equivalent vehicle rotational mass 7.

Electric motor 2 has a rotational mass having moment of inertia $J_{EM}$ in which the moment of inertia of the rotor of electric motor 2 and the rotatory moments of inertia of parts of torque converter 5 and of separating clutch 3 are combined.

Angular velocity $\omega_{EM}$ of the rotational mass of electric motor 2 is measured by an engine speed sensor 9 and relayed to a vehicle control 10. An additional engine speed sensor 11 ascertains angular velocity $\omega_{Fz}$ of equivalent vehicle rotational mass 7, which is also reported to vehicle control 10.

Air gap torque $M_{EM}$, pump torque $M_P$ required for the drive of torque converter 5 and moment $M_{TK}$ transferred by separating clutch 3 act on the rotational mass of electric motor 2. Vehicle control 10 is also connected to separating clutch 3 so that moment $M_{TK}$ of separating clutch 3 is influenced by disengagement and engagement of separating clutch 3.

During electric driving, separating clutch 3 is disengaged and moment $M_{TK}$ transferred by separating clutch 3 is zero. Internal combustion engine 1 is started from electric driving by engaging separating clutch 3 while driving. This means that electric motor 2 is rotating and internal combustion engine 1 is initially still stationary. Internal combustion engine 1 is tow-started at a moment $M_{TK}<0$, and there is a dip in angular velocity $\omega_{EM}$ of electric motor 2. During ramp-up of internal combustion engine 1, overshooting of the rotational speed of the internal combustion engine occurs due to the initial firing, resulting in a temporary increase in angular velocity $\omega_{EM}$ of electric motor 2. Both factors affect the rest of the drive train and negatively impact driving comfort due to jerking movements of the vehicle.

Figure 2:
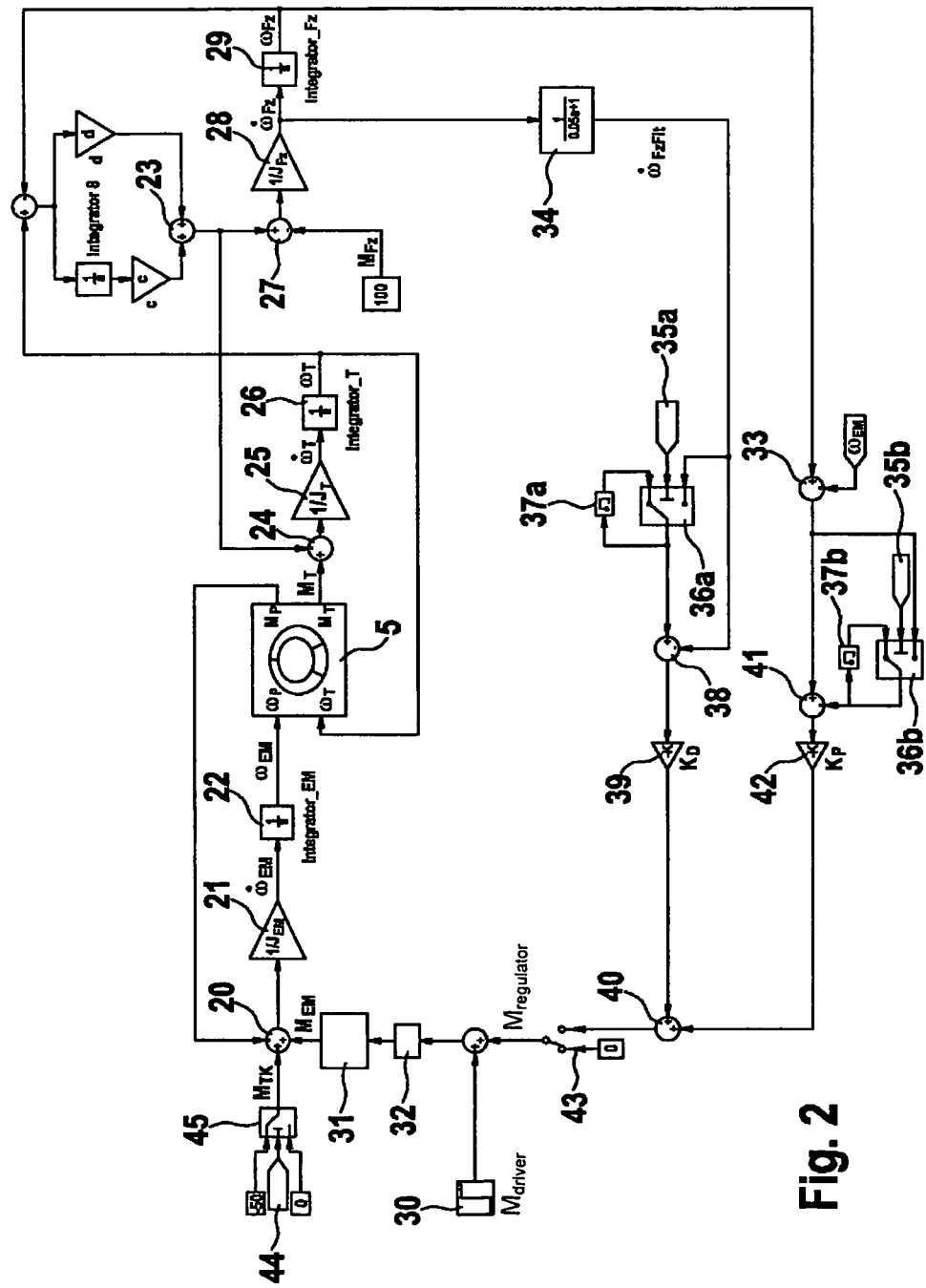
FIG. 2 shows a signal flow chart for the drive train according to FIG. 1.

FIG. 2 shows a signal flow chart for the drive train explained according to FIG. 1. Pump moment $M_P$ and turbine moment $M_T$ of torque converter 5 depend on the rotational speeds and angular velocities of the pump wheel and turbine wheel (not shown further here) of torque converter 5. The pump wheel is coupled to electric motor 2 and rotates at angular velocity $\omega_{EM}$ of electric motor 2. Turbine wheel 6 rotates at angular velocity $\omega_T$.

The torques acting on the rotational mass of electric motor 2 such as moment $M_{TK}$ transferred by separating clutch 3, air gap torque $M_{EM}$ of electric motor 2 and pump moment $M_P$ acting during the driving of torque converter 5 are added up (block 20) and divided by moment of inertia $J_{EM}$ of the rotational mass of electric motor 2 (block 21). This yields an angular acceleration $\bar{\omega}_{EM}$ of the rotational mass of electric motor 2, which is integrated into block 22, yielding angular velocity $\omega_{EM}$ of electric motor 2.

Air gap torque $M_{EM}$ is obtained from driver's intended moment $M_{driver}$ during electric driving, this being ascertained from the position of the accelerator pedal (block 30) and/or predefined by a driver assistance system or an idling control. Air gap torque $M_{EM}$ corresponds to driver's intended moment $M_{driver}$ according to a moment regulating response of electric motor 2 and also corresponds to the signal transit times with a time lag, which is illustrated by a filter block 31 and a time lag 32.

Turbine moment $M_T$ which is output by torque converter 5 is calculated in block 24 using the torque of torsion spring 8 obtained in block 23 and then dividing by moment of inertia $J_T$ of turbine rotational mass 6 (block 25), yielding angular acceleration $\bar{\omega}_{EM}$ of turbine rotational mass 6. Integration of angular acceleration $\bar{\omega}_{EM}$ results in angular velocity $\omega_T$ of turbine rotational mass 6.

Angular acceleration $\bar{\omega}_{Fz}$ of equivalent vehicle rotational mass 7 is determined by dividing the total torque by moment of inertia $J_{Fz}$ of equivalent vehicle rotational mass 7 (block 28) from the torque of torsion spring 8 and a driving resistance moment $M_{Fz}$ derived from the driving resistance of the hybrid vehicle, which are added up in block 27. Here again, angular velocity $\omega_{Fz}$ of the equivalent vehicle rotational mass is obtained by integration of angular acceleration $\bar{\omega}_{Fz}$ in block 29.

As FIG. 2 shows, a moment $M_{TK}$ transferred by separating clutch 3 has an effect on the angular velocities and on turbine moment $M_T$. Turbine moment $M_T$ corresponds to the moment delivered by torque converter 5 to the automatic transmission and thus to the drive wheels. Moment $M_{TK}$ transferred by the separating clutch changes greatly during starting of the engine and constitutes a disturbance for the driver's intent. It may cause jerking and rotational vibrations of the drive train.

To suppress these effects, in block 33 angular velocity $\omega_{Fz}$ of equivalent vehicle rotational mass 7 is compared with the actual angular velocity of electric motor 2 in block 33 and a difference is formed.

The variables of equivalent vehicle rotational mass 7 may be ascertained in a determination on the basis of a measurement based on wheel rotational speeds, vehicle velocity, differentiated wheel rotational speeds and the longitudinal acceleration of the vehicle, measured by an electronic stability system. An observer may be used for the determination. Slippage on the wheels must be taken into account. Angular acceleration $\bar{\omega}_{EM}$ of equivalent vehicle rotational mass 7 is filtered in block 34, yielding angular acceleration $\bar{\omega}_{FzFlt}$. This filtering is necessary because of signal noise of an acceleration sensor, for example, or of a differentiated rotational speed signal.

In blocks 35a and 35b, a binary signal $B_{regulator}$ is activated for a certain time period t2 to t3, for example, for 0.3 s, so that the switches in blocks 36a and 36b switch to the position shown in FIG. 2. Memory blocks 37a and 37b ensure that filtered angular acceleration $\bar{\omega}_{FzFlt}(t2)$ present at point in time t2, i.e., at the start of the time span, and the difference in the angular velocities $(\omega_{Fz}(t2)-\omega_{EM}(t2))$ are applied at the outputs of switches 36a and 36b within this period of time.

Angular acceleration $\bar{\omega}_{FzFlt}(t2)$ is a setpoint value for the starting operation and is compared with prevailing angular acceleration $\bar{\omega}_{FzFlt}(t)$ in block 38. The resulting differences are multiplied by a gain factor $K_D$ in block 39 and added to air gap torque $M_{EM}$ of electric motor 2 in block 40.

Setpoint difference $(\omega_{Fz}(t2)-\omega_{EM}(t2))$, which is saved at point in time t2, is likewise compared with prevailing difference $(\omega_{Fz}(t)-\omega_{EM}(t))$ in block 41, multiplied by a gain factor $K_P$ in block 42 and also switched to air gap torque $M_{EM}$ of electric motor 2 in block 40.

On the whole, a regulator moment as follows is obtained for the period of time between t2 and t3

$M_{regulator}=K_D[\bar{\omega}_{FzFlt}(t2)-\bar{\omega}_{FzFlt}(t)]+K_P[(\omega_{Fz}(t)-\omega_{EM}(t))-(\omega_{Fz}(t2)-\omega_{EM}(t2))]$ Outside of this period of time, it holds that $M_{regulator}=0$.

The regulator is activated for period of time t2 to t3 with the aid of switch 43, which activates regulation only during the starting operation of internal combustion engine 1 during driving operation of the hybrid vehicle.

The starting operation causes comfort-reducing jerking vibrations and drive train vibrations. Equivalent vehicle rotational mass 7 and the rotational mass of electric motor 2 then usually vibrate out of phase. The inertial conditions usually result in lower vibration amplitudes at angular velocity $\omega_{Fz}(t)$ of the equivalent vehicle rotational mass and higher vibration amplitudes at angular velocity $\omega_{EM}(t)$ of the rotational mass of electric motor 2. The jerking vibrations and drive train vibrations act on regulator moment $M_{regulator}$ and thus air gap torque $M_{EM}$ of electric motor 2 via the activated regulation explained here and thus active vibration damping is achieved.

The regulator intervention is terminated at point in time t3 according to the descriptions presented here. However, the regulator may also be active for a certain period of time longer for ongoing damping of jerking vibrations and drive train vibrations, which may occur after the start of internal combustion engine 1.

Figure 3:
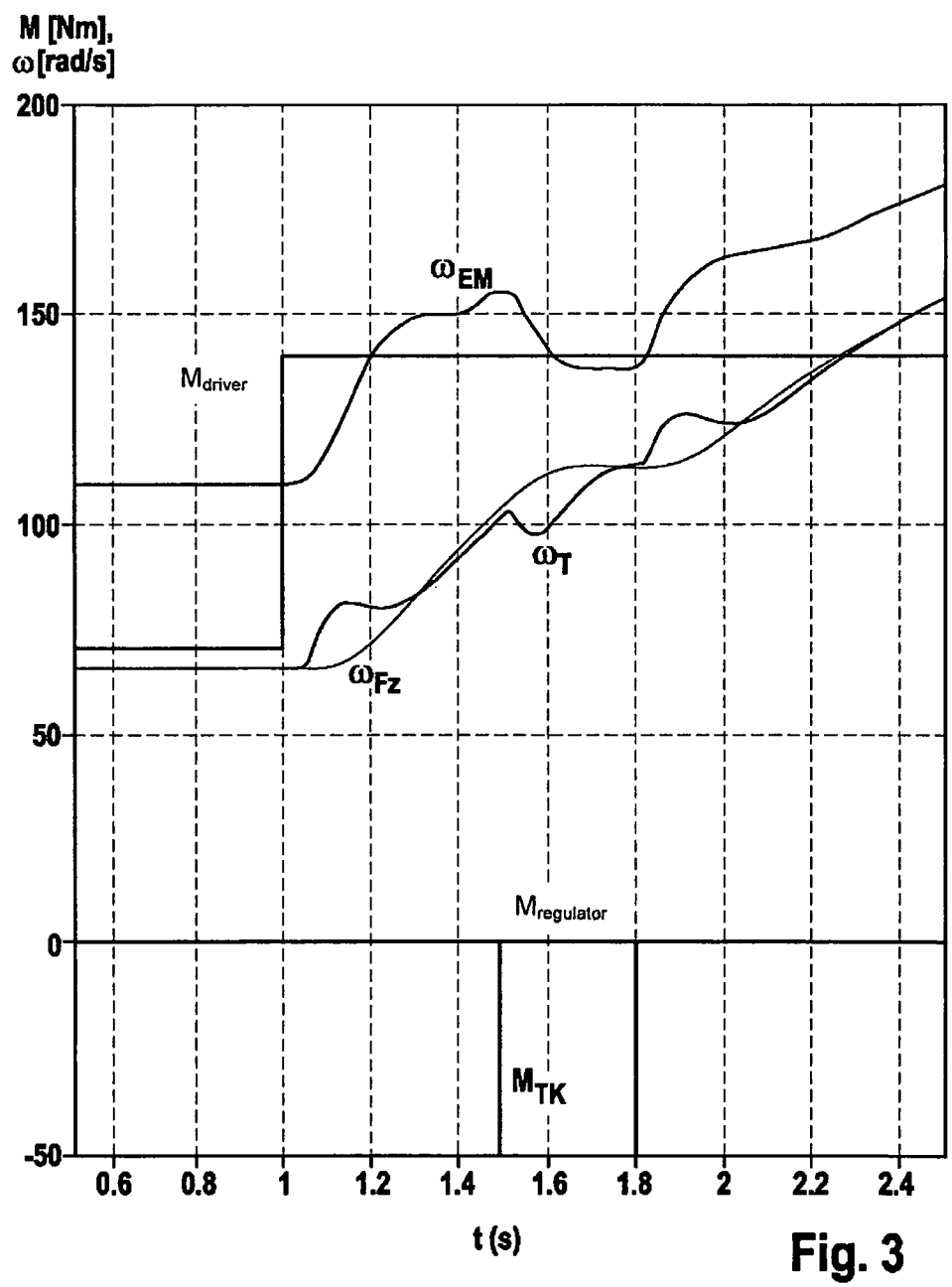
FIG. 3 shows characteristic curves of the torques and angular velocities according to the related art.

FIG. 3 shows a torque M in Nm and angular velocity $\omega$ in rad/s plotted as a function of time t in seconds. At point in time t1=1 sec, there is a jump in driver's intended moment $M_{driver}$ from 70 Nm to 140 Nm. A binary signal $B_{TK}$ (block 44 in FIG. 2) is activated in the period of time from t2=1.5 seconds to t3=1.8 seconds, so that the switch in block 45 jumps to the position shown in FIG. 2 and outputs a negative separating clutch moment $M_{TK}$. This yields $M_{TK}=0$ Nm for $t \leq 1.5$ s or $t \geq 1.8$ s $M_{TK}=-50$ Nm for $1.5$ s$<t<1.8$ s The starting operation of internal combustion engine 1 is thus simulated in a simplified form.

In addition, FIG. 3 shows the characteristic curves of angular velocities $\omega_{EM}$, $\omega_T$ and $\omega_{Fz}$. The dip in angular velocity $\omega_{Fz}$ of the equivalent vehicle rotational mass due to separating clutch moment $M_{TK}$ is clearly detectable. Since regulator moment $M_{regulator}$ according to the present invention does not intervene in the case shown here, driving comfort is greatly impaired and the vehicle is decelerated, although driver's intended moment $M_{driver}$ does not change.

Figure 4:
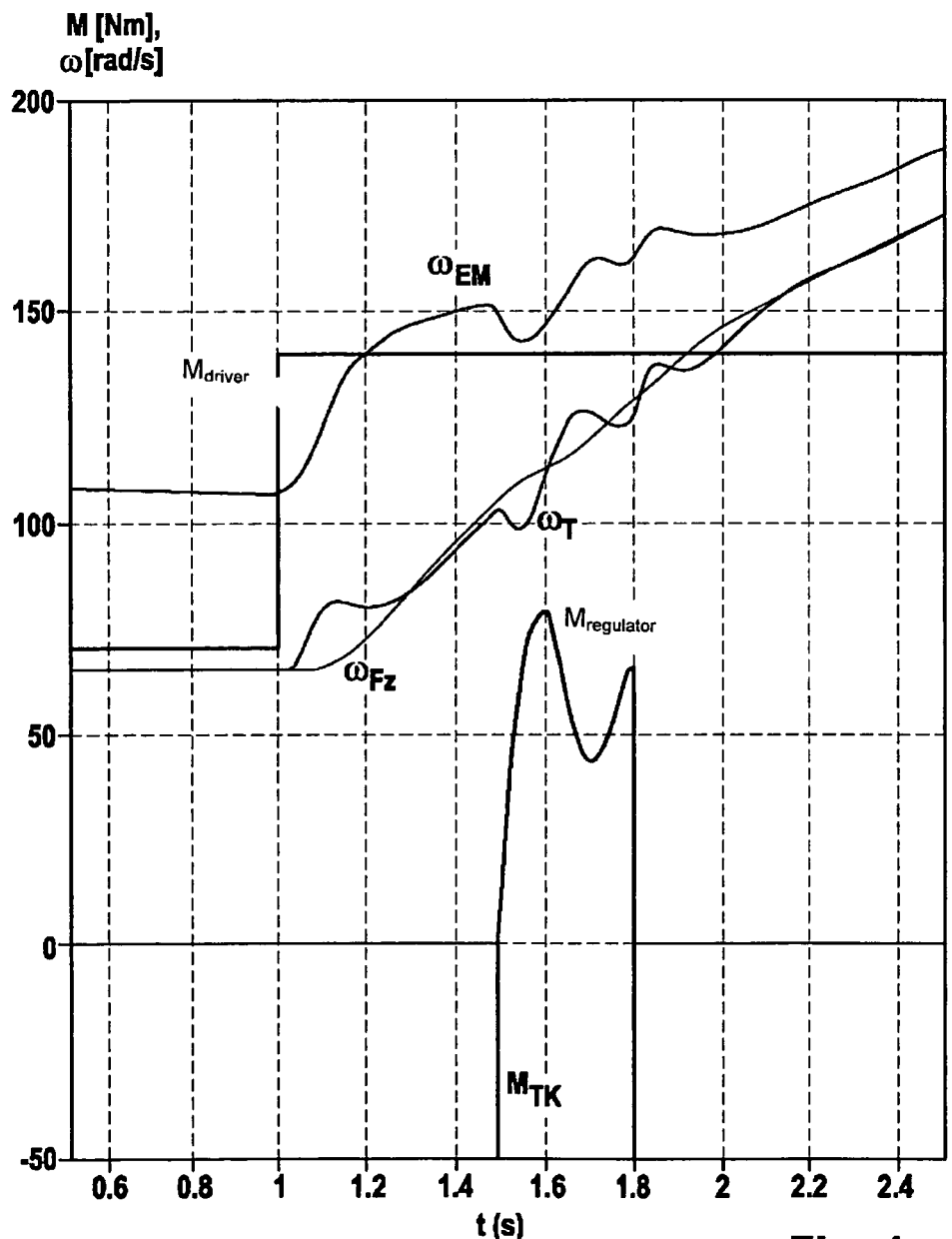
FIG. 4 shows characteristic curves of the torques and angular velocities according to the method according to the present invention.

FIG. 4 shows results obtained under the same boundary conditions as in FIG. 3, although using the regulation according to the present invention. The dip in angular velocity $\omega_{Fz}$ of the equivalent vehicle rotational mass due to separating clutch moment $M_{TK}$ is very low in comparison with FIG. 3, which results in a high level of driving comfort.

Figure 5:
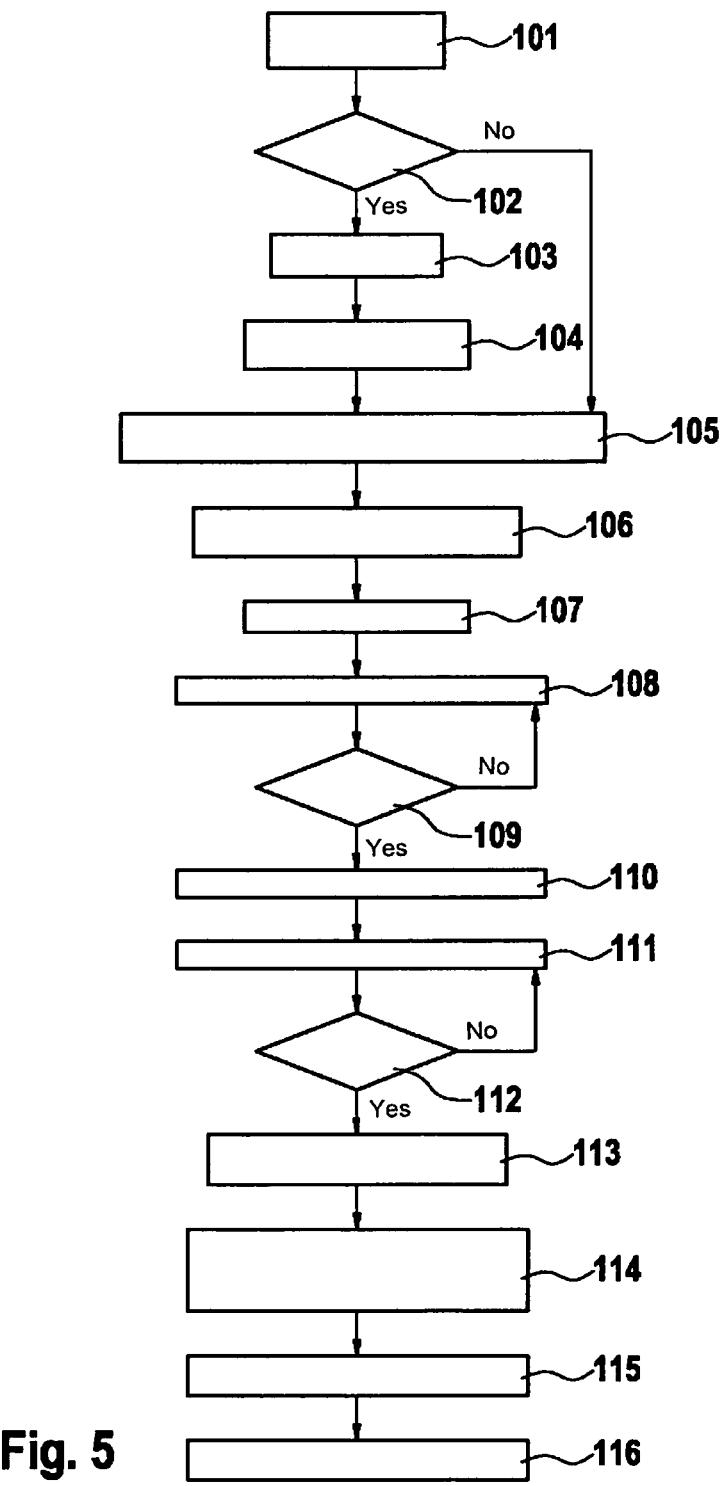
FIG. 5 shows a schematic flow chart of one exemplary embodiment of the method according to the present invention.

The sequence of the method as a function of time will now be discussed with reference to FIG. 5.

In block 101, the hybrid vehicle is driving purely electrically. This means that the separating clutch is disengaged and the moment of separating clutch $M_{TK}=0$ Nm. Regulation is deactivated ($M_{regulator}=0$ Nm) and internal combustion engine 1 is at a standstill. A check is then performed in block 102 to determine whether the bridging clutch of torque converter 5 is engaged. If this is the case, it is disengaged in block 103. Differential angular velocity $(\omega_{Fz}(t)-\omega_{EM}(t)) \neq 0$ rad/s is subsequently built up via torque converter 5. During the method steps in blocks 103 and 104, the separating clutch remains disengaged and the regulator is deactivated.

The method progresses to block 105.

The method proceeds directly to this block 105 from block 102 if it has been found that the bridging clutch of torque converter 5 is already disengaged.

Filtered angular acceleration $\overline{\omega}_{FzFlt}(t2)$ ascertained at point in time t=t2 from the longitudinal movement of the vehicle and differential angular velocity $(\omega_{Fz}(t2)-\omega_{EM}(t2))$ are saved in block 105. At the same time, regulation is activated at point in time t=t2 (block 106) via which the variables ascertained from the longitudinal movement of the vehicle are attributed to air gap torque $M_{EM}$ of electric motor 2. It holds that:

$M_{regulator}=K_D[\overline{\omega}_{FzFlt}(t2)-\overline{\omega}_{FzFlt}(t)]+K_P[(\omega_{Fz}(t)-(\omega_{EM}(t))-(\omega_{Fz}(t2)-\omega_{EM}(t2))]$ In block 107, engagement of the separating clutch begins at point in time t=t2, where the torque of separating clutch $M_{TK}$ is less than 0 Nm. Since separating clutch 3 is initially in a slipping state, internal combustion engine 1 is tow-started and accelerated (block 108). Then in block 109 a measurement is performed to determine whether the angular velocity of internal combustion engine 1 exceeds a threshold for the firing or injection. If this is not the case, the method returns to block 108 and internal combustion engine 1 is accelerated further.

If the angular velocity of the internal combustion engine has exceeded the threshold for injection or firing, the injection or firing of internal combustion 1 begins in block 110. In this state, rotational speed overshooting may occur on internal combustion engine 1. In block 111 the angular velocities of internal combustion engine 1 and of electric motor 2 are approximated, separating clutch 3 still being in a slipping state.

In block 112, it is determined whether the angular velocity of internal combustion engine 1 is equal to the angular velocity of electric motor 2. If this is not the case, the method returns to block 111 and the angular velocities are adapted further. If the angular velocities of internal combustion engine 1 and electric motor 2 are the same, the separating clutch is completely engaged in block 113. This happens at point in time t=t3. It is considered to be the optimal state here that internal combustion engine 1 feeds a low torque into the drive train at point in time t=t3, moment $M_{TK}$ transferred by separating clutch 3 being almost 0 Nm.

In block 114 at point in time t=t3, regulation is deactivated and the torque of regulator $M_{regulator}=0$ Nm. Alternatively, regulation may remain activated for a longer period to actively dampen vibrations in the drive train. An elapsed period or the fact that detected vibrations have subsided may be considered a deactivation criterion.

Next in block 115, driver's intended moment $M_{driver}$ is shifted to internal combustion engine 1 because separating clutch 3 is now engaged. Hybrid driving occurs in block 116, i.e., electric motor 2 and internal combustion engine 1 jointly generate driver's intended moment $M_{driver}$.

The regulation according to the present invention may also be useful for stopping internal combustion engine 1. This is possible if internal combustion engine 1 is in overrun fuel cutoff and is deactivated by the disengaging of the separating clutch 3 which is associated with a rapid change in moment $M_{TK}$ transferred by the separating clutch.

In the simplified schematic diagram according to FIG. 1, inertias, elasticities and dampings are translated to the transmission input shaft in accordance with the gear ratios. When there are changes in the gear ratio, for example, due to a gear shift, these converted variables change. An adjustment in regulation and/or regulator gain factors is advantageous. The variables such as wheel rotational speeds, wheel rotational accelerations and/or longitudinal acceleration of the vehicle, which describe the longitudinal movement of the vehicle, are also converted according to the gear ratios to angular velocity $\omega_{Fz}$ filtered angular acceleration $\overline{\omega}_{FzFlt}$ of equivalent vehicle rotational mass 7. Changing gear ratios as well as slippage on the wheels must be taken into account in the conversions.

The performance of separating clutch moment $M_{TK}$ is shown in simplified terms in FIGS. 3 and 4.

For tow-start and acceleration of internal combustion engine 1, there is first a negative separating clutch moment $M_{TK}<0$ and thus a positive regulator moment $M_{regulator}>0$ Nm. When combustion begins correctly, internal combustion engine 1 may generate a positive torque which results in a positive separating clutch moment $M_{TK}>0$ after successful tow-start and acceleration. When regulation becomes active again in block 114, a corresponding positive separating clutch moment $M_{TK}>0$ Nm is compensated by a negative regulator moment $M_{regulator}<0$ Nm. Regulator moment $M_{regulator}$ results in a change in sign. Thus a correct start of internal combustion engine 1 and correct combustion may be recognized from the time characteristic of regulator moment $M_{regulator}$ and/or the time characteristic of the setpoint values and actual values. This is true in particular when a difference between the setpoint value and actual value exceeds or falls short of a predefined threshold.

Use of the approach according to the present invention is possible even in hybrid drives having no torque converter 5.

What is claimed is:

1. A method for operating a hybrid vehicle having at least a first drive unit and a second drive unit, comprising:
   one of: (i) starting the idle first drive unit, during driving of the hybrid vehicle, by transferring part of a torque of the operating second drive unit to the first drive unit; or (ii) stopping the operating first drive unit, during the driving of the hybrid vehicle, by interrupting a transfer of a torque from the first drive unit to the second drive unit;

wherein the torque of the second drive unit is influenced by at least one variable derived from longitudinal movement of the hybrid vehicle;

wherein the at least one of the variables derived from the longitudinal movement of the hybrid vehicle is determined by measuring at least one of (i) a wheel rotational speed, (ii) a wheel rotational acceleration, (iii) a longitudinal velocity of the vehicle, and (iv) a longitudinal acceleration of the vehicle.

2. The method as recited in claim 1, wherein the variable derived from the longitudinal movement of the vehicle is high-pass filtered and influences the torque of the second drive unit.

3. The method as recited in claim 1, wherein at least one of the variables derived from the longitudinal movement of the hybrid vehicle represents a setpoint value, and wherein the setpoint value is compared with an actual value at least one of (i) supplied by the second drive unit, and (ii) derived from the movement of the hybrid vehicle, and wherein the torque of the second drive unit is regulated as a function of the comparison between the setpoint value and the actual value.

4. The method as recited in claim 3, wherein the at least one variable derived from the longitudinal movement of the hybrid vehicle represents at least one of (i) a velocity of an equivalent vehicle rotational mass, (ii) a differential velocity between the equivalent vehicle rotational mass and a mass of the second drive unit, and (iii) an angular acceleration of the equivalent vehicle rotational mass.

5. The method as recited in claim 4, wherein the acceleration of the equivalent vehicle rotational mass is filtered.

6. The method as recited in claim 4, wherein the at least one variable derived from the longitudinal movement of the vehicle is ascertained at a point in time when an engagement operation of a separating clutch begins.

7. The method as recited in claim 3, wherein the comparison of the setpoint value with the actual value derived from the movement of the vehicle is performed for a predefined time period.

8. The method as recited in claim 7, wherein the setpoint value remains unchanged for the predefined time period.

9. The method as recited in claim 8, wherein the predefined time period includes the range from the beginning of an engagement operation of a separating clutch until the complete engagement of the separating clutch.

10. The method as recited in claim 9, wherein the setpoint value is ascertained on the basis of a model.

11. The method as recited in claim 7, wherein the starting operation of the first drive unit is recognized on the basis of the time characteristic of a difference between the setpoint value and the actual value.

12. A control system for operating a hybrid vehicle having at least a first drive unit and a second drive unit, comprising:
a control unit configured to:
(i) start the idle first drive unit, during driving of the hybrid vehicle, by transferring part of a torque of the operating second drive unit to the first drive unit;
(ii) influence the torque of the operating second drive unit by at least one variable derived from longitudinal movement of the hybrid vehicle;
wherein the at least one of the variables derived from the longitudinal movement of the hybrid vehicle is determined by measuring at least one of (i) a wheel rotational speed, (ii) a wheel rotational acceleration, (iii) a longitudinal velocity of the vehicle, and (iv) a longitudinal acceleration of the vehicle.

13. The device as recited in claim 12, wherein a separating clutch is situated between the first drive unit and the second drive unit, and wherein the first drive unit is started by transferring part of the torque of the second drive unit to the first drive unit by engaging the separating clutch.

14. The device as recited in claim 12, wherein a planetary gear is situated between the first drive unit and the second drive unit, and wherein the first drive unit is started by transferring part of the torque of the second drive unit to the first drive unit via the planetary gear.

15. The device as recited in claim 12, wherein the first drive unit is situated on a first vehicle axle and the second drive unit is situated on a second vehicle axle.

* * * * *